United States Patent Office 3,069,476
Patented Dec. 18, 1962

3,069,476
NEW PROCESS FOR MANUFACTURING CHLORO-NITRO DERIVATIVES OF METHANE
Pierre Baumgartner, Asnieres, France, assignor to Institut Francais du Petrole, des Carburants et Lubrifiants, Paris, France
No Drawing. Filed Jan. 11, 1960, Ser. No. 1,436
Claims priority, application France Jan. 15, 1959
12 Claims. (Cl. 260—644)

It is well known that the manufacture of chloro-nitro derivatives of methane and especially of chloropicrin is of particular industrial interest. However, until now the production was uneconomical since the known methods of preparation of these products are complicated and require the use of raw materials of relatively high cost.

It is therefore an object of the present invention to provide a process for making chloro-nitro derivatives of methane and particularly chloropicrin under much more economical conditions by using, as starting materials, products which are easily available in substantial amounts at relatively low prices.

Acetone is one of the starting materials which fulfills these conditions and which is consequently of particular interest for carrying out the synthesis of chloro-nitro derivatives of methane and particularly of chloropicrin. However, the results obtained according to the known processes using acetone as starting material are quite unsatisfactory.

It is consequently another object of the invention to provide a new process for manufacturing on an industrial scale chloro-nitro derivatives of methane and particularly chloropicrin, using acetone as starting material, and with high yields.

It is a further object of my invention to provide a simple process for making chloro-nitro derivatives of methane and in particular chloropicrin by treating acetone with reactants which are easily available in substantial amounts and at low costs.

These and other objects which will be apparent from the following description, are accomplished by my invention through the use of acetone, molecular chlorine and nitric acid as reactants, and under specific conditions as described below.

My invention may be carried out either in a batch or in a continuous process by reacting, under very simple conditions, molecular chlorine and nitric acid with acetone. Chlorine and nitric acid may be reacted simultaneously with acetone or in successive steps either by first chlorinating acetone and thereafter reacting nitric acid with the resulting reaction mixture or by submitting the reaction mixture of acetone with nitric acid to the action of chlorine, provided that in every case molecular chlorine is used. Although molecular chlorine may be used in the liquid state, it is generally more convenient to use it in the gaseous state, especially when moderate pressures are to be used.

As a matter of fact the use of chlorine formed in situ, as that evolved from aqua regia or obtained from other methods, does not lead to satisfactory yields in chloro-nitro derivatives of methane due to the excessive importance of parasitic reactions.

This is confirmed, for instance, by the results obtained in the following experiment, wherein percentages are by weight:

39 g. of acetone are progressively added during 2 hours to a mixture of 156 g. of 61 percent aqueous solution of nitric acid with 234 g. of a 37.6 percent aqueous solution of hydrochloric acid, maintained at a temperature of 40° C. The resulting reaction mixture is subsequently heated in a water-bath during 1 hour and the reaction product is distilled with steam. There are thus obtained 13 grams of an oil having a 47 percent content of chloropicrin (as determined by means of an infra-red analysis).

According to one embodiment of the invention a stream of chlorine is caused to pass through an aqueous solution of nitric acid and acetone, the latter being introduced either entirely at the beginning of the reaction or preferably in a progressive manner during the course of the latter.

It is more particularly advantageous to provide a highly efficient contact between chlorine and nitric acid by means, for instance, of a stirrer or a chlorine diffuser such as a perforated ring. In order to make the operating conditions easier, acetone is preferably introduced in the liquid state. Gas and vapors issued from the reaction vessel, which may contain particularly chlorine and nitrogen oxides, are removed and the reaction product generally appears as a separate oily layer. At the end of the reaction this oily layer may be separated from the nitric acid by any conventional separating process such as, for example, decantation, distillation, distillation with steam and solvent extraction, especially by means of chlorinated solvents such as carbon tetrachloride, hydrocarbons or other solvents of chloropicrin preferably selected among those having a low solubility in aqueous mineral acids.

According to another embodiment of my invention acetone is chlorinated, as a first step by means of a gaseous stream of chlorine and, as a second step, the resulting chlorinated mixture is caused thereafter to react with nitric acid. The oily reaction product thus obtained may be separated according to any conventional separating process such as, for example, those mentioned supra.

The relative amounts of the reactants providing high yields of chloropicrin are in the order of at least one mole of nitric acid and 3 moles of chlorine per each mole of acetone. However, higher amounts of nitric acid and/or chlorine per each mole of acetone are preferred for carrying out the process according to my invention under the best conditions. On the other hand lower proportions of nitric acid and/or chlorine relative to the amount of acetone would have a detrimental effect since they would result in a significant lowering of the conversion rate of acetone.

Nitric acid is preferably used in the form of its aqueous solution but the latter must advantageously be chosen with a moderate dilution, i.e. a concentration of more than 10% by weight and preferably in the range of from 40 to 70 percent, in order to obtain good results. Nitric acid may as well be formed in situ, for instance, by causing nitrogen dioxide to react with water; this will also result in the simultaneous formation of nitrous acid.

The reaction is generally facilitated by providing to the reaction mixture nitrous acid or products leading to the formation of nitrous acid in situ under the reaction conduitions such as, for instance, nitrogen dioxide ($NO_2$), a mineral or an organic salt of nitrous acid, particularly a nitrite of an alkali metal or of an amine or an alkyl-nitrite. One of the preferred embodiments of the invention involves the use of one of said agents, but, when a nitrite is to be used, the minimum amount of nitric acid as required according to my invention must be increased by that supplemental quantity which is necessary to liberate the nitrous acid from its derivative. Inversely when using nitrogen dioxide the minimum amount of nitric acid, necessary for carrying out the reaction, may be correspondingly reduced due to the formation of both nitric and nitrous acids resulting from the reaction of said nitrogen dioxide with water.

However, a still preferred embodiment of my invention, leading both to a high yield and a high selectivity of the formation of chloropicrin consists of a two-steps process according to which nitric and nitrous acids are simultaneously or in successive order caused to react with acetone as a first step and the resulting reaction mixture is thereafter chlorinated as a second step.

In the case of said last-mentioned embodiment the ratio of the reactant amounts which give the best results is of about one mole of nitrous acid, one mole or more of nitric acid and three moles or more of chlorine per each mole of acetone. It is, however, still possible, although less advantageous to change that preferred ratio of the reactants and to use, for example, per each mole of acetone from 0.1 to 1.5 moles of nitrous acid, at least 1 mole of nitric acid and at least 3 moles of chlorine.

It is more particularly of advantage to add nitrous acid to other reactants in a progressive manner, so as to avoid any substantial liberation of gases which would result in a lowering of the yield and a loss of reactants. However, the liberation of nitrous vapors at the end of the reaction of nitration and/or nitrosation cannot be completely avoided even under said preferential operating conditions. The second chlorination step is only carried out when said liberation of nitrous vapors shows a substantial completion of the first step.

The process according to my invention may be carried out at relatively low temperatures, not in excess of 100° C. and, for instance, in the range of from −20° C. to +100° C. However, when the reaction is carried out as a single-step process and in the presence of a significant amount of nitrous acid, of about 0.5 to 1 mole per mole of acetone or in the presence of a compound capable of liberating said amount of nitrous acid, the preferential temperature range is of from −10 to +30° C. On the other hand, when only a low quantity of nitrous acid is present during the reaction and more particularly, when nitrous acid is omitted, the temperature range will be preferably higher, i.e., for instance of from 20 to 50° C.

In the case of a two-steps reaction according to the above-mentioned preferred embodiment of the invention, each of the two successive steps is preferably carried out at temperatures of from −10 to +30° C.

In every case, however, the temperature may, without inconvenience, be higher at the end than at the beginning of the reaction.

Too low a temperature would result in a correspondingly low reaction velocity and a too high temperature would favor parasitic reactions, thus lowering the chloropicrin yield.

It is more convenient to carry out the reaction under atmospheric pressure but subatmospheric as well as superatmospheric pressures may as well be employed. It is more efficient to use chlorine under pressure, for example, up to 20 atmospheres, which results in a significant increase of the reaction velocity.

The oily product thus obtained at the end of the reaction may be used as such or after a further purification, for instance by distillation.

Moreover, it is possible to obtain valuable by-products and particularly acetic acid by distilling the aqueous phase from the reaction.

I have discovered, and this constitutes a further advantage of my invention, that the oily raw product obtained from the reaction may be used as such, without any purification, as an agent for repulsion and destruction of obnoxious animals and plants and particularly as an insect-killer, fungicide, destroying agent for obnoxious animals such as rodents, worms, etc., or as an earth-disinfectant, in any form in general use for parasite destroying agents, i.e. in a vapor, liquid or solid state obtained respectively by using the product either as such or in admixture with a diluent in a vaporized or atomized form or as impregnating agent on a powdered solid support to be sprayed.

The following examples which are illustrative of the process according to my invention are not to be considered as limitative in any way of the scope of this disclosure. The chloropicrin contents of the reaction mixtures have been determined on the basis of comparative results of infrared spectrography analysis applied respectively to said reaction mixtures and to a sample of pure chloropicrin. The percentages are by weight.

Example I

Into a reaction vessel provided with external cooling means and with a stirring device, maintained at a temperature of 45° C., are introduced 800 cc. of a 61 percent aqueous solution of nitric acid and a stream of gaseous chlorine is caused to pass therethrough. When the solution is saturated with chlorine, 145 g. (2.5 moles) of acetone are progressively added thereto in two hours, at a temperature of 45° C., while the chlorine saturation is maintained by bubbling gaseous chlorine into the resulting mixture. At the end of this step the stream of chlorine is further maintained for one hour at the same temperature of 45° C. The mixture is then cooled to 20° C. and the oily layer is separated by decantation. The oily layer is washed with water, treated with four times its volume of a solution of sodium hypochlorite at a concentration of 5 moles of the latter per liter of water, so as to remove any products of parasitic reactions, thereafter decanted, washed again with water and finally dried over anhydrous calcium chloride. Thus are obtained 245 g. of an oil having a boiling range of 62–70° C. under a reduced pressure of 87 mm. Hg. This oil consists of a mixture of chloronitro derivatives of methane containing 30 percent of chloropicrin. The oil may be employed as such in an atomized form as an insecticide particularly for destroying flies and mosquitos.

Under the same operating conditions as hereabove described but with 3000 cc. of a 37.6% aqueous solution of hydrochloric acid in admixture with the nitric acid leading to the formation of chlorine in situ, instead of the gaseous stream of chlorine there are obtained only 50 g. of an oil containing 30 percent of chloropicrin. This experiment clearly shows that the use of aqua regia, producing nascent chlorine leads to a yield of chloropicrin substantially lower than that obtained according to the process of my invention.

Example II

The process is carried out in the same way as according to Example I, except that 0.5 g. of sodium nitrite are further added to the aqueous solution of nitric acid saturated with chlorine and that the temperature is maintained at 20° C. Thus are obtained 185 g. of an oil having a boiling range of 50–63° C. under a reduced pressure of 87 mm. Hg. This oil, consisting of a mixture of chloronitro derivatives of methane, containing 45 percent of chloropicrin, may be sprayed out in the air in an atomized form for the destruction of rats and mice.

Example III

The operating conditions of the process are the same as according to Example I except that the 2.5 moles of acetone are replaced by 2.5 moles of monochloroacetone (230 g.). Thus are obtained 195 g. of an oil consisting of a mixture of chloronitro derivatives of methane having a 33 percent content of chloropicrin, said mixture being readily usable as an earth-disinfectant.

A product leading to the same results may be obtained according to the above-described conditions but using, instead of monochloroacetone, the corresponding amount of a raw mixture of the chloro-derivatives of acetone obtained as the final products of the reaction carried out by passing a stream of chlorine through acetone at ambient temperature, until one mole of chlorine for each mole of acetone is consumed in reaction.

Example IV

The process is carried out according to Example I except that the temperature is maintained at 55° C. and the 800 cc. of a 61 percent aqueous solution of nitric acid are replaced by 350 cc. of a 98 percent nitric acid solution.

There are obtained 207.5 g. of a mixture of chloronitro derivatives of methane, consisting substantially exclusively of polynitro derivatives of methane.

*Example V*

The process is operated under the same conditions as according to Example I, except that the 800 cc. of a 61 percent aqueous solution of nitric acid are replaced by 900 cc. of an 80 percent nitric acid solution having added thereto 0.1 g. of sodium nitrite. Thus are obtained 270 g. of chloronitro derivatives of methane having a 15 percent content of chloropicrin.

*Example VI*

The operating conditions of the process are the same as according to Example I, except that the temperature is maintained at 20° C. and that the 800 cc. of a 61 percent aqueous solution of nitric acid are replaced by 860 cc. of an 80 percent nitric acid solution having added thereto 0.5 g. of sodium nitrite. Thus are obtained 160 g. of chloronitro derivatives of methane having a 23 percent content of chloropicrin. By distillation under a reduced pressure of 87 mm. Hg, 36 g. of pure chloropicrin, having a boiling point of 49–51° C. under that pressure, can be isolated.

*Example VII*

The process is carried out according to Example I, except that the 800 cc. of a 61 percent aqueous solution of nitric acid are replaced by 1100 cc. of a 50 percent aqueous solution of nitric acid having added thereto 0.5 g. of sodium nitrite. There are obtained 244 g. of chloronitro derivatives of methane having a 30 percent content of chloropicrin, which, after distillation under a reduced pressure of 87 mm. Hg, give 71 g. of pure chloropicrin (having under this pressure a boiling point of 49–51° C.).

*Example VIII*

The operating conditions of the process are the same as those described in Example I except that the temperature is maintained at 60° C. and that the 800 cc. of a 61 percent aqueous solution of nitric acid are replaced by 1100 cc. of a 50 percent solution of nitric acid. Thus are obtained 223 g. of chloronitro derivatives of methane having a 14 percent content of chloropicrin.

*Example IX*

150 cc. of a 63 percent aqueous solution of a nitric acid are admixed with 75 cc. of acetone, at a temperature of +5° C. and to this mixture are progressively added in 3 hours, under stirring, a solution of 70 g. of sodium nitrite in 120 cc. of water, the temperature being maintained below 15° C. by means of an ice-bath. The reaction mixture thus separates in 2 layers. After having added thereto 500 cc. of water under the same stirring conditions and having maintained the temperature below 20° C., a stream of chlorine is caused to pass through the resulting mixture at such a rate that it is substantially completely absorbed in the liquid phase. When the absorption tends to decrease, the temperature is brought up to 65° C. while maintaining the stream of chlorine. When at this temperature the absorption of chlorine tends to reach a zero value, the feeding of chlorine is stopped.

After cooling, the lower oily layer is decanted, washed with sodium hypochlorite and with water and thereafter dried. There are thus obtained 90 g. of oil.

The mother liquors are distilled with steam and after the same treatments as heretofore described, lead to a supplemental output of 23 g. of oil.

The overall amount of oil thus obtained reaches therefore 113 g. and has a chloropicrin content of 92 percent.

It will be understood that while there have been given certain specific examples of the practice of this invention, it is not intended thereby to have this invention limited to or circumscribed by the specific details of materials, proportions or conditions herein specified, in view of the fact that the invention may be modified according to individual preference or conditions without necessarily departing from the spirit of this disclosure and the scope of the appended claims.

It will be understood that this invention is susceptible to further modification and, accordingly, it is desired to comprehend such modifications within this invention as may fall within the scope of the appended claims.

What I claim is:

1. A process for the manufacture of chloronitro derivatives of methane comprising the step of admixing in the liquid phase acetone, chlorine and nitric acid at a temperature of less than 100° C. and the subsequent step of removing said thus obtained chloro-nitro derivatives of methane from the reaction mixture.

2. A process for the manufacture of chloropicrin comprising the steps of (a) admixing in the liquid phase together acetone, chlorine and nitric acid at a temperature in the range of −20 to +100° C. and (b) separating the resulting chloropicrin from the reaction mixture.

3. A process for the manufacture of chloronitro derivatives of methane comprising the step of admixing in the liquid phase acetone, chlorine, nascent nitrous acid and nitric acid at a temperature of less than 100° C. and the subsequent step of removing said thus-obtained chloronitro derivatives of methane from the reaction mixture.

4. A process for the manufacture of chloronitro derivatives of methane comprising the successive steps of (a) passing a stream of chlorine through liquid acetone and (b) treating the resulting reaction mixture with an aqueous solution of nitric acid having a concentration of the latter of more than 10 percent.

5. A process for the manufacture of chloronitro derivatives of methane comprising a first step of (a) admixing in the liquid phase acetone, nascent nitrous acid and nitric acid, and a second step of (b) passing a stream of chlorine therethrough when a substantial amount of nitrous vapors is liberated as a result of a corresponding substantial completion of said first step.

6. A process for the manufacture of chloropicrin comprising a first step of (a) admixing in the liquid phase acetone, nascent nitrous acid and a nitric acid solution at a concentration of more than 10 percent, and a second step of (b) passing a stream of chlorine therethrough when a substantial amount of nitrous vapors is liberated as a result of a corresponding substantial completion of said first step.

7. A process for the manufacture of chloropicrin comprising a first step of (a) admixing in the liquid phase acetone, nascent nitrous acid and a nitric acid solution at a concentration in the range of 40 to 70 percent, and a second step of (b) passing a stream of chlorine therethrough when a substantial amount of nitrous vapors is liberated as a result of a corresponding substantial completion of said first step.

8. A process for the manufacture of chloropicrin comprising a first step of (a) admixing in the liquid phase to each mole of acetone at least 1 mole of nitric acid, at most to 1.5 moles of nascent nitrous acid and less than 3 moles of chlorine, and a second step of (b) passing a stream of chlorine therethrough when a substantial amount of nitrous vapors is liberated as a result of a corresponding substantial completion of said first step, the total amount of chlorine being at least 3 moles.

9. A process for the manufacture of chloropicrin comprising a first step of (a) admixing in the liquid phase acetone, nascent nitrous acid and nitric acid at a temperature of from −10° C. to +30° C., and a second step of (b) passing a stream of chlorine therethrough at said temperature range when a substantial amount of nitrous vapors is liberated as a result of a corresponding substantial completion of said first step.

10. A process for the manufacture of chloronitro derivatives of methane comprising the successive steps of (a) admixing in the liquid phase acetone and nitric acid, (b) progressively adding nascent nitrous acid to the mixture so as to substantially maintain the latter saturated therewith, and (c) passing a stream of chlorine through the resulting mixture.

11. A process for the manufacture of chloronitro derivatives of methane comprising the successive steps of (a) admixing in the liquid phase acetone, nascent nitrous acid and nitric acid and (b) passing a stream of gaseous chlorine therethrough.

12. A process for the manufacture of chloropicrin comprising the successive steps of (a) admixing acetone, nitric acid and nascent nitrous acid in the liquid phase for a sufficient time to permit the evolution of nitrous acid vapors, thereby ensuring a substantially complete reaction, the mol ratio per mol of acetone being at least one mol of nitric acid and up to 1.5 mols of nitrous acid, and (b) passing gaseous chlorine therethrough in amount of at least 3 moles per each mole of acetone contained in the liquid mixture.

References Cited in the file of this patent

UNITED STATES PATENTS 2,181,411    Vanderbilt _____ Nov. 28, 1939

OTHER REFERENCES

Hass et al.: Journal of the American Chemical Society, vol. 76, No. 10, May 20, 1954, pp. 2692–2694.